(12) United States Patent
Tanju et al.

(10) Patent No.: US 11,976,916 B2
(45) Date of Patent: May 7, 2024

(54) OPTICAL SURFACE STRAIN MEASUREMENTS FOR PIPE INTEGRITY MONITORING

(71) Applicant: Chevron U.S.A. Inc., San Ramon, CA (US)

(72) Inventors: Baha Tanju, Katy, TX (US); Hariprasad Janakiram Subramani, Katy, TX (US); Peter Crowder, Houston, TX (US); Lee Rhyne, Cypress, TX (US); Nikolaos Ioannis Salmatanis, Cypress, TX (US); Pedro Vargas, Katy, TX (US); Milind L. Prabhu, Katy, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/363,512

(22) Filed: Jun. 30, 2021

(65) Prior Publication Data
US 2023/0003511 A1 Jan. 5, 2023

(51) Int. Cl.
*G01B 11/16* (2006.01)
(52) U.S. Cl.
CPC .................. *G01B 11/165* (2013.01)
(58) Field of Classification Search
CPC ....... G01B 11/165; G01B 11/16; G01B 11/06; G01B 11/18; G01B 21/045; E21B 47/007; G01D 5/35316; G01D 5/35383; G01D 3/0365; G01M 3/047; G01M 3/2807; G01M 3/2861; G01M 3/38; G01L 9/0032

USPC .......... 356/32, 35.5, 445–448, 237.1–237.5; 385/12, 13, 111
See application file for complete search history.

(56) References Cited

U.S. PATENT DOCUMENTS

| 5,942,750 A | 8/1999 | Sannerhaugen et al. |
| 7,315,555 B2 | 1/2008 | Van Der Spek et al. |
| 8,941,821 B2 | 1/2015 | Coupe et al. |
| 2008/0047622 A1 | 2/2008 | Dria et al. |
| 2012/0099097 A1 | 4/2012 | Coupe et al. |
| 2012/0143522 A1* | 6/2012 | Chen ..................... E21B 47/002 702/42 |

(Continued)

FOREIGN PATENT DOCUMENTS

EP 1296117 A1 * 3/2003

OTHER PUBLICATIONS

International Search Report for PCT/US/2022/035314 dated Oct. 5, 2022.

*Primary Examiner* — Hoa Q Pham
(74) *Attorney, Agent, or Firm* — King & Spalding LLP

(57) ABSTRACT

An optical strain gauge system measures strain on the exterior surface of a pipe to identify areas of wear on the interior surface of the pipe. The optical strain gauge system comprises an optical sensing interrogator and at least one optical fiber. The optical sensing interrogator comprises a light source and a light sensor. The at least one optical fiber includes fiber Bragg gratings along the length of the optical fiber. The optical fiber is arranged on the exterior surface of the pipe with the fiber Bragg gratings forming a two-dimensional array of points at which strain measurements are obtained. The two-dimensional array of strain measurement points provides an accurate assessment of the strains on the exterior of the pipe which can be used to identify areas of wear on the interior surface of the pipe.

13 Claims, 12 Drawing Sheets

(56) References Cited

U.S. PATENT DOCUMENTS

| | | |
|---|---|---|
| 2012/0143524 A1 | 6/2012 | Chen et al. |
| 2013/0104672 A1* | 5/2013 | Kim ............... B25J 13/085 |
| | | 73/862.624 |
| 2015/0316427 A1* | 11/2015 | Carralero ........... G01D 5/266 |
| | | 356/35.5 |
| 2016/0161350 A1* | 6/2016 | Balasubramaniam ................ |
| | | G01M 5/0025 |
| | | 73/800 |
| 2018/0033339 A1* | 2/2018 | Kerins .............. G09B 23/34 |
| 2018/0171778 A1 | 6/2018 | Hoehn et al. |

* cited by examiner

Summary of Strain Results

| Location | Finite Element Analysis Strain Result (µε) @2000psi | Resistive Foil Strain Gauge Measurement (µε) @2000psi | Optical Strain Gage Measurement (µε) @2000psi |
|---|---|---|---|
| Eroded Straight (Sensor Location #1) (@min Thickness) | 160 | 189 | 115 |
| Eroded Elbow (Sensor Location #2) @min Thickness | 230 | 344 | 349 |
| Un-Eroded Elbow (Sensor Location #3) | N/A | 400 | 415 |
| Un-Eroded Straight (Sensor Location #4) | 390 | 408 | 411 |

FIG. 9

OPTICAL SURFACE STRAIN MEASUREMENTS FOR PIPE INTEGRITY MONITORING

TECHNICAL FIELD

Embodiments of the technology relate generally to measuring surface strain on a pipe to determine the integrity of the pipe.

BACKGROUND

Metal piping systems are commonly used to transport fluids, including water, gasses, and petroleum products. The piping systems can include straight and bent sections of pipe, as well as sections with more complex geometries such as reducers, expanders, elbow joints, and tee joints. These piping systems are subject to internal wear from erosion and/or corrosion caused by the flow of the fluids within the piping systems. Additionally, solid particles that may be flowing with the fluids within the piping can contact the inner surface of the piping systems and exacerbate erosion. Erosion tends to be most severe at locations where the piping geometry redirects the fluid flow, such as at elbow and tee joints. The fluids transported within the piping systems are often transported under pressure which adds stress to the walls of the piping systems.

In order to maintain the integrity of the piping systems, a variety of techniques are available to monitor sections of the pipe systems and detect internal wear of the pipe sections. One approach uses ultrasonic sensors permanently mounted on the outside of the piping. Another approach uses a pipeline inspection gauge ("PIG") that travels along the inside of the piping system and uses sensors, such as ultrasonic sensors or magnetic flux leakage sensors, to detect wear. The foregoing approaches have limitations in that they may only gather data at a fixed location, they may require interruption of the fluid transport process, they can be expensive to deploy, they are limited in applicable pipe sizing and geometry, they may require personnel to complete challenging tasks in the field, and they cannot passively provide measurements continuously or immediately on demand. The foregoing limitations are particularly acute for piping systems located undersea or in hazardous locations.

U.S. Pat. No. 8,941,821 to Coupe et al. ("Coupe") describes using optical fibers placed on the outer surface of a pipe to measure strain in the pipe wall. The optical fibers described in Coupe include fiber Bragg gratings ("FBGs") that can reflect light when the surface of the pipe deforms. The reflected light can be processed into a strain measurement. However, Coupe is limited in that it teaches spacing the FBGs at least one meter apart and only taking localized measurements at discrete and widely spaced points on the surface of the pipe. A shortcoming of Coupe's approach is that wear can occur along the inner wall of the pipe in irregular contours and at unexpected locations. For example, an area of wear that has a narrow channel shape or a hemispherical shape could easily escape detection using the approach described in Coupe. The localized measurements at discrete and widely spaced points described in Coupe will not provide an accurate assessment of the erosion and corrosion that may be present in various areas along the inner wall of the pipe.

Accordingly, there is a need for an improved technique for detecting wear within piping systems. Specifically, a sensing technique that can collect data with greater resolution to provide a more complete and accurate assessment of the condition of the inner surface of the piping system would be beneficial. Additionally, a sensing technique that can collect data for substantial lengths (e.g. a kilometer) of the piping system would be beneficial. Furthermore, a sensing technique that collects data passively without the need for a local power source would be beneficial.

SUMMARY

In one example embodiment, the present disclosure is generally directed to an optical strain gauge system for measuring strain on an exterior surface of a piping system. The optical strain gauge system can comprise an optical strain gauge comprising a plurality of fiber Bragg gratings configured to attach to the exterior surface of the piping system; and an optical sensing interrogator, the optical sensing interrogator comprising a light source, a light sensor, and a signal processor. The light sensor can be configured to convert reflected light from the plurality of fiber Bragg gratings into a plurality of electrical signals. The signal processor can be configured to convert the plurality of electrical signals into a plurality of strain measurements. Lastly, the plurality of fiber Bragg gratings can be configured to be arranged on the exterior surface of the piping system with a spacing of not less than 4 mm and not greater than 4 cm between each fiber Bragg grating of the plurality of fiber Bragg gratings.

The foregoing example embodiment can include one or more of the following elements. The optical strain gauge can be arranged on the exterior surface of the piping system with the plurality of fiber Bragg gratings forming a two-dimensional array. The two-dimensional array of fiber Bragg gratings can correlate to a two-dimensional indication of wear on an interior surface of the piping system.

In the foregoing example system, the plurality of strain measurements can be compared to prior strain measurements for the piping system. Alternatively, or in addition, the plurality of strain measurements can be compared to prior strain measurements collected from other piping systems.

Another example of the foregoing system can include a second optical strain gauge. In one example, the optical strain gauge and the second optical strain gauge are arranged in parallel encircling the exterior surface of the piping system. In another example, the optical strain gauge and the second optical strain gauge are overlapping. The optical strain gauge can measure hoop strain and the second optical strain gauge can measure axial strain.

In yet another example, the foregoing system can include a second optical strain gauge arranged on the exterior surface of the piping system in an S pattern with major lengths of the S pattern parallel to a longitudinal axis of the piping system. The optical strain gauge and the second optical strain gauge can overlap.

In another example embodiment, the present disclosure is generally directed to a method of measuring strain on an exterior surface of a piping system using an optical strain gauge system. The method can comprise attaching a plurality of fiber Bragg gratings of an optical strain gauge to the exterior surface of the piping system, wherein the plurality of fiber Bragg gratings are configured to be arranged on the exterior surface of the piping system with a spacing of not less 4 mm and not greater than 3 cm between each fiber Bragg grating of the plurality of fiber Bragg gratings. The method can further comprise transmitting an incident light from a light source through the optical strain gauge and receiving, at a light sensor, a reflected light from the plurality of fiber Bragg gratings. Furthermore, the method can comprise converting, by the light sensor, the reflected light into a plurality of electrical signals and determining, by a signal processor, a plurality of strain measurements from the plurality of electrical signals.

The foregoing example embodiment can include one or more of the following elements. The optical strain gauge can be arranged on the exterior surface of the piping system with the plurality of fiber Bragg gratings forming a two-dimensional array. The two-dimensional array of fiber Bragg gratings can correlate to a two-dimensional indication of wear on an interior surface of the piping system.

The foregoing example method can further comprise comparing the plurality of strain measurements to prior strain measurements for the piping system. Alternatively, or in addition, the example method can further comprise comparing the plurality of strain measurements to prior strain measurements collected from other piping systems.

Another example of the foregoing method can comprise attaching a second optical strain gauge to the exterior surface of the piping system, wherein the optical strain gauge and the second optical strain gauge are arranged in parallel encircling the exterior surface of the piping system. In another example, the foregoing method can comprise attaching a second optical strain gauge to the exterior surface of the piping system, wherein the second optical strain gauge overlaps the optical strain gauge. The optical strain gauge can measure hoop strain and the second optical strain gauge can measure axial strain.

Yet another example of the foregoing method can comprise attaching a second optical strain gauge to the exterior surface of the piping system in an S pattern with major lengths of the S pattern parallel to a longitudinal axis of the piping system. The optical strain gauge and the second optical strain gauge can overlap.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of a piping monitoring system and method and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

FIG. 9 is a table of strain data in accordance with an example embodiment of the disclosure.

DETAILED DESCRIPTION OF EXAMPLE EMBODIMENTS

The example embodiments discussed herein are directed to systems and methods for an optical strain gauge system for detecting wear on the interior of a piping system. The example systems and methods described herein are particularly beneficial in the oil and gas industry where fluids are often transported through lengthy piping systems. The example systems described herein improve upon prior approaches to detecting wear within a piping system because they can be deployed more easily in remote locations, including remote undersea locations. As will be described, the approaches disclosed herein provide a more accurate assessment of wear along the inner surface of a piping system. Obtaining an accurate assessment of wear within a piping system is beneficial in that pipe failures and unplanned downtime for the piping system can be reduced. Additionally, improved wear assessment reduces premature and unnecessary replacement of piping sections in which wear is not yet a problem. The foregoing benefits will be evident from the following description of example embodiments for optical strain gauge systems.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
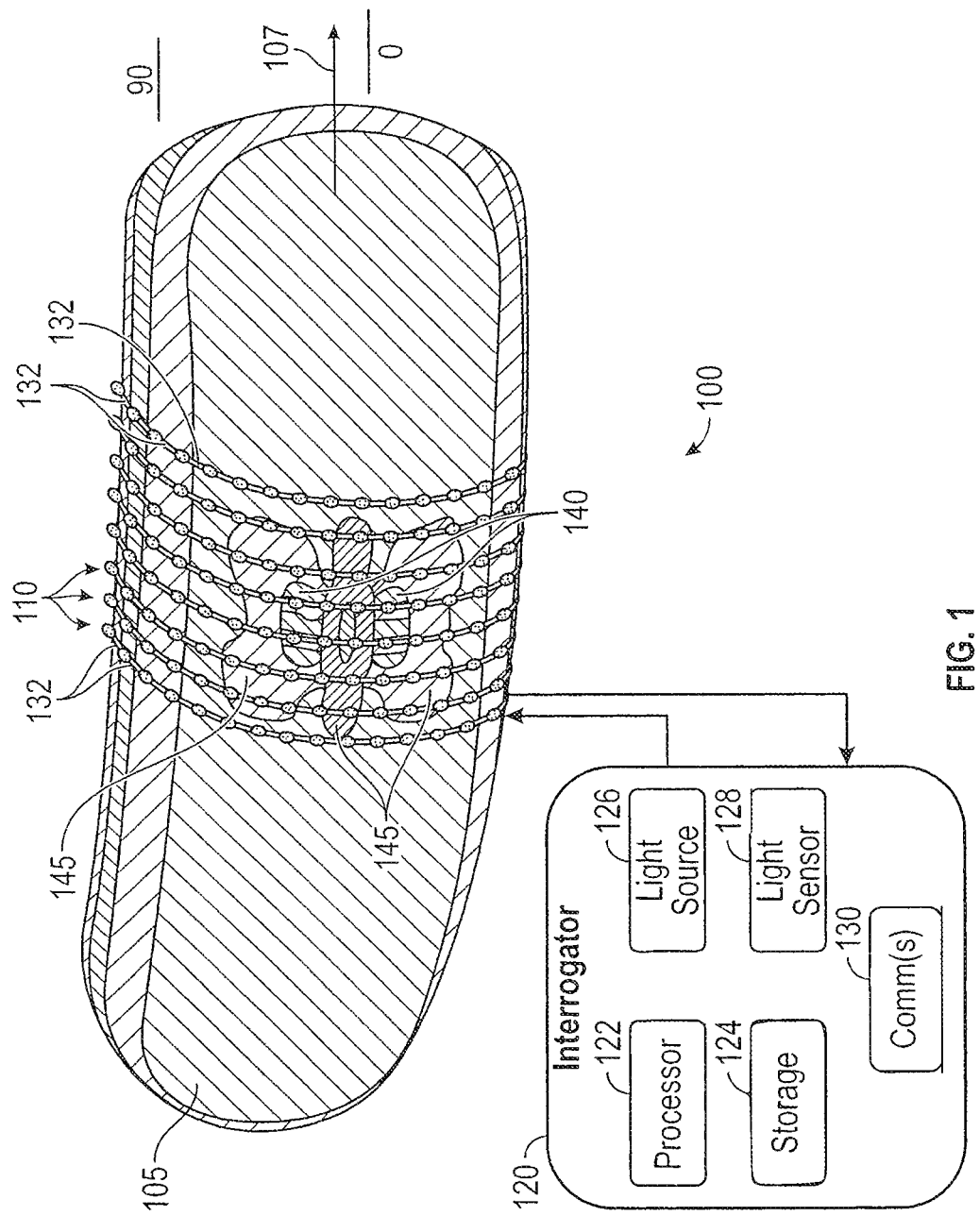
FIG. 1 illustrates an optical strain gauge attached to the exterior of a pipe in accordance with an example embodiment of the disclosure.

FIGS. 1-4 illustrate an optical strain gauge system in accordance with example embodiments of the disclosure. Referring to FIG. 1, an optical strain gauge system 100 attached to a section of pipe 105 is illustrated. The section of pipe 105 has a bend and could be a portion of a much longer piping system located on land or undersea. Fluid passes through the pipe along the direction of the longitudinal axis 107 of the section of pipe 105.

The illustration in FIG. 1 is a model created using finite element analysis software. The model simulates an area of wear on an inner surface of pipe 105 that is pressurized. Tables 1 and 2 set forth below provide the properties assumed for the model and the loads applied to the pipe.

TABLE 1

Geometric properties of the elbow pipe

| | |
|---|---|
| Outer Diameter ($D_o$) = | 219.075 mm |
| Wall thickness (WT) = | 12.7 mm |
| Inner Diameter ($D_i$) = | 193.675 mm |

TABLE 2

Mechanical (linear elastic) properties and loads applied to the pipeline

| | |
|---|---|
| Yield Strength (SMYS, $F_y$) = | 414 MPa (60 ksi) |
| Elastic Modulus ($E_s$) = | 207 GPa |
| Poisson's ratio (ν) = | 0.3 |
| Yield Strain ($\varepsilon_{el} = F_y/E_s$) = | 0.2% |
| Hoop Stress ($\sigma_h$) = (assumed) | 60% $F_y$ = 248.21 MPa |
| Internal Pressure ($P_i$) = | $\sigma_h$ (2 WT)/$D_i$ = 32.552 MPa |
| Nom. Strain ($\sigma_h/E_s$) = | 0.12% |

In the model, the area of wear is located on the inner surface of pipe 105 at a height that is in line with the 0 degree position and at approximately the midpoint from the left end and the right end of the pipe 105. As a result of the pressure and the area of wear, uneven hoop strains are present on the exterior surface of the pipe 105. The varying shading illustrated on the exterior of the pipe 105 indicates different magnitudes of hoop strain. For example, the model created by the finite element software indicates areas of relatively large hoop strain 140 immediately above and below the area of wear. Moving upward and downward away from the large hoop strain areas 140, the shading indicates areas of relatively small hoop strain 145. Towards the top of the pipe 105 at the 90 degree position, the hoop strain increases again as indicated by the darker shading.

Also shown in the example of FIG. 1 is the optical strain gauge system 100. The optical strain gauge system 100 comprises an optical strain gauge 110 and an optical sensing interrogator 120. The optical strain gauge 110 comprises loops of at least one optical fiber wrapped around the circumference of the pipe 105. While 8 loops of optical fiber are illustrated in the example of FIG. 1, it should be understood that the optical fiber can be arranged to monitor large lengths of pipe including distances up to, for example, 1 kilometer.

Each loop of optical fiber in FIG. 1 comprises FBGs 132 disposed along the length of the optical fiber. Different types of optical strain gauge systems can be used. Using FBGs in the optical strain gauge system is advantageous because the FBGs provide a well-defined sensor with a high signal-to-noise ratio resulting in high strain sensitivity, resolution, and accuracy. However, an optical strain gauge system without FBGs can use a scattering technique that detects strain by measuring scattering of light caused by naturally occurring and random imperfections in the fiber optic cable. In the scattering approach, the optical strain gauge system obtains data by observing changes in naturally occurring Raman, Brillouin, or Rayleigh backscattering patterns. The scattering approach is fully distributed, meaning data can be obtained along the entire length of the fiber instead of only at critical points. The distributed nature of the scattering approach allows for collection of data over several kilometers and provides a distributed profile of strain along the length of the fiber. However, the scattering approach can be limited in that resolution is only on the order of meters and data acquisition speed is limited.

When high resolution and high data acquisition rates are required, an optical strain gauge system with FBGs is a better approach. With FBGs, two different data demodulation techniques are wavelength division multiplexing ("WDM") and optical frequency domain reflectometry ("OFDR"). WDM can cover large distances and can obtain data quickly. WDM technology can support multiple gratings on a fiber, but each grating that is added significantly reduces the data refresh rate. WDM allows for strain monitoring at the location points of the FBGs, as opposed to the entire strain profile along the length of the optical fiber. Therefore, applications requiring very high speed data acquisition, but only for a small number of data points are well-suited for the WDM technology.

On the other hand, OFDR demodulation technology uses FBGs placed end-to-end resulting in a fully distributed sensing fiber. OFDR has significantly higher spatial resolution that the scattering approach and has exponentially more gratings than the WDM technique. OFDR is able to maintain high data refresh rates even as the number of FBG sensors increases. OFDR is more sophisticated than scattering and FBGs using WDM and therefore provides higher spatial resolution, quick data refresh rates, a large number of FBG sensors, and full distribution along the length of the fiber optic cable.

Referring again to the example of FIG. 1, the FBGs are arranged in a two-dimensional array on the exterior surface of the pipe 105 and the two-dimensional array of FBGs covers the area of wear located on the interior surface of the pipe 105. The FBGs are spaced so that each FBG is within a distance of adjacent FBGs that is not less than 4 mm and not greater than 4 cm. Each FBG measures strain at a point on the exterior surface of the pipe 105 where the FBG is attached to the exterior surface. With the two-dimensional array of FBGs as illustrated in FIG. 1, a detailed set of surface strain measurements is obtained for the area encompassed by the optical strain gauge. Variations in the surface strain measurements can be correlated to areas of wear on the interior surface of the pipe. Therefore, the two-dimensional array of data points provided by the FBGs provides a more complete picture of variations in wear on the interior surface of the pipe without accessing the interior of the pipe 105.

When the optical strain gauge system 100 is operated, a light source 126 of the optical sensing interrogator 120 sends incident light through the optical fiber of the optical strain gauge 110. Areas of the exterior surface of the pipe 105 that deform due to strain will cause the FBGs to return reflected light to the light sensor 128. The light sensor is configured to convert the reflected light into electrical signals that can be processed by processor 122 into strain measurements. Software for managing the transmission and collection of light signals and for processing the electrical signals received from the light sensor can be stored in storage device 124. The resulting strain data from the processing of the electrical signals also can be stored in storage device 124.

The optical sensing interrogator 120 also can comprise a communication interface 130 for transmitting the strain measurements to a remote computing device, such as a monitoring station. The communication interface 130 can transmit and receive signals via signal transfer links. The signal transfer links can include wired and/or wireless (radio or light) signal transfer links that transmit and receive communications via known communication protocols. For instance, the communication interface 130 can receive wireless command signals from a remote device that directs the optical sensing interrogator 120 to begin collecting strain measurements. In alternate embodiments, the processing of the electrical signals into strain measurements also can be performed by a remote computing device. In example embodiments, the interrogator 120 can comply with explosion-proof requirements because it may be attached to a piping system in a hazardous location such as at a production well or a refinery. The ability to transmit signals to and from the optical sensing interrogator 120 can be particularly advantageous when the optical strain gauge system is located in a hazardous location.

Those of skill in this field having the benefit of the present disclosure will understand that components of the optical sensing interrogator 120 are commercially available. For instance, the processor 122 can be one or more hardware processors such as an integrated circuit, a central processing unit, a multi-core processing chip, an SoC, a multi-chip module including multiple multi-core processing chips, or other hardware processor in one or more example embodiments. The processor 122 is known by other names, including but not limited to a computer processor, a signal processor, a microprocessor, and a multi-core processor. In alternate embodiments, the one or more processors can be replaced by other logic devices such as one or more field programmable gate arrays (FPGAs). Using FPGAs and/or other similar devices known in the art allows the optical strain gauge system 100 to be programmable and function according to certain logic rules and thresholds without the use of a hardware processor.

The storage device 124 can include one or more cache memories, main memory, and/or any other suitable type of memory. The storage device 124 can be a persistent storage device (or set of devices) that stores software and data used in the operation of the optical sensing interrogator 120. In one or more example embodiments, the storage device 124 can store an operating system, algorithms, and stored data. For example, an algorithm can dictate when an operating cycle for the optical sensing interrogator 120 is to be entered and how many cycles to run. Such algorithms can be based on information received via the communication interface 130, from data entered by a user via an input/output interface, or may be static variables that are programmed into the optical sensing interrogator 120. Stored data can include the strain measurements, time measured by a timer, adjustments to an algorithm, threshold values, user preferences, default values, results of previously run or calculated algorithms, and/or any other suitable data.

The optical sensing interrogator 120 can collect strain measurements at predetermined time intervals such as hourly, daily, weekly, monthly, bi-monthly, semi-annually, or annually as needed to monitor the pipe. The collected strain measurements can be stored in storage 124 or at a remote computing system for comparison against future strain measurements. Storing and comparing strain measurements over time assists in identifying pipe that may be degrading over time.

Although not shown in FIG. 1, the optical sensing interrogator also can include an input/output interface such as a keyboard, display, or touch screen interface, that allows a user to enter commands and information to the optical sensing interrogator 120, and also allows information to be presented to the user and/or other components or devices. A bus (not shown) can allow the various components of the optical sensing interrogator 120 to communicate with one another. A bus can be one or more of any of several types of bus structures, including a memory bus or memory controller, a peripheral bus, an accelerated graphics port, and a processor or local bus using any of a variety of bus architectures. The components shown in FIG. 1 are not exhaustive, and in some embodiments, one or more of the components shown in FIG. 1 may not be included in an example system. Further, one or more components shown in FIG. 1 can be rearranged.

Figure 2:
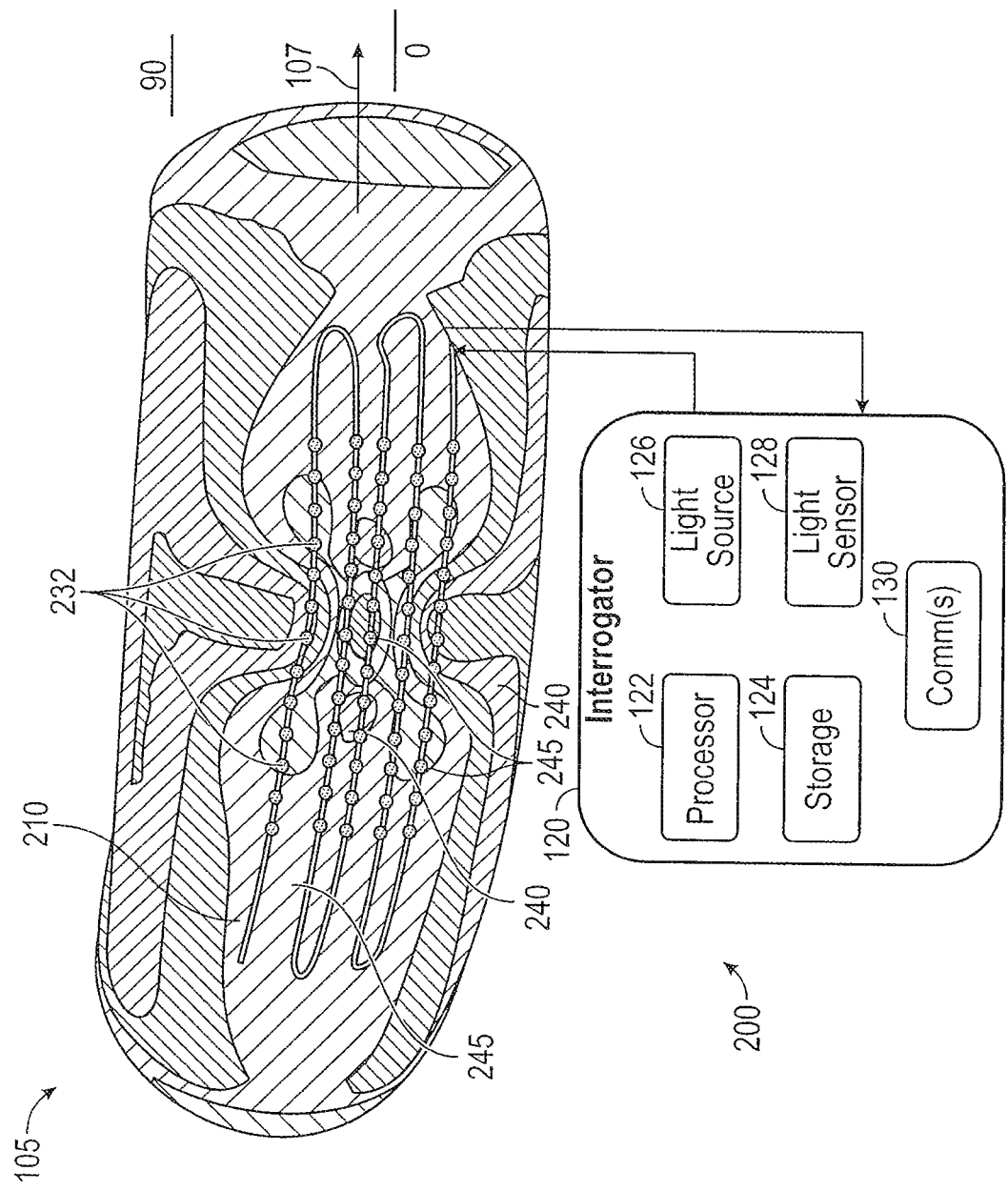
FIG. 2 illustrates another optical strain gauge attached to the exterior of a pipe in accordance with an example embodiment of the disclosure.

Referring to FIG. 2, another optical strain gauge system 200 is illustrated. Optical strain gauge system 200 comprises an optical sensing interrogator 120 similar to that described previously in connection with FIG. 1. It can be assumed that the previous description of the components and operation of the optical sensing interrogator 120 provided in connection with FIG. 1 also applies to the interrogator 120 illustrated in FIG. 2. Optical strain gauge system 200 is attached to pipe section 105 for measuring axial strain on the exterior surface of the pipe. As explained in connection with FIG. 1, the pipe section 105 is a model of a pipe section created using finite element analysis software. The pipe section 105 transports fluids in the direction of the longitudinal axis 107 of the pipe section 105 and the pipe section 105 may be part of a larger piping system.

It can be assumed that the model shown in FIG. 2 has the same properties and is subject to the same load as described above for FIG. 1. The model includes an area of wear located at a height of the pipe section aligned with the 0 degree position and at approximately the midpoint from the left end and the right end of the pipe 105. As a result of the pressure and the area of wear, uneven axial strains are present on the exterior surface of the pipe 105. The varying shading illustrated on the exterior of the pipe 105 indicates different magnitudes of axial strain. For example, the model created by the finite element software indicates areas of relatively large axial strain 240 adjacent to the area of wear. Moving outward away from the large axial strain areas 240, the shading indicates areas of relatively small axial strain 245. Towards the top of the pipe 105 at the 90 degree position, the axial strain increases again as indicated by the darker shading.

The optical strain gauge 210 comprises an optical fiber arranged on the pipe 105 in an "S pattern" that oscillates back and forth with major lengths of the S pattern being parallel to the longitudinal axis 107 of the pipe 105. It should be understood that in other examples the optical fiber can be arranged in other patterns, including patterns covering substantial lengths of pipe up to, for example, 1 kilometer. The optical fiber comprises FBGs 232 disposed along the length of the optical fiber. In the example of FIG. 2, the FBGs are arranged in a two-dimensional array on the exterior surface of the pipe 105 and the two-dimensional array of FBGs covers the area of wear located on the interior surface of the pipe 105. The FBGs are spaced so that each FBG is within a distance of adjacent FBGs that is not less than 4 mm and not greater than 4 cm. Each FBG measures strain at a point on the exterior surface of the pipe 105 where the FBG is attached to the exterior surface. With the two-dimensional array of FBGs as illustrated in FIG. 2, a detailed set of surface strain measurements is obtained for the area encompassed by the optical strain gauge. From the detailed set of surface strain measurements, a more accurate assessment of areas of wear on the interior surface of the pipe 105 can be obtained without accessing the interior of the pipe 105.

Figure 3:
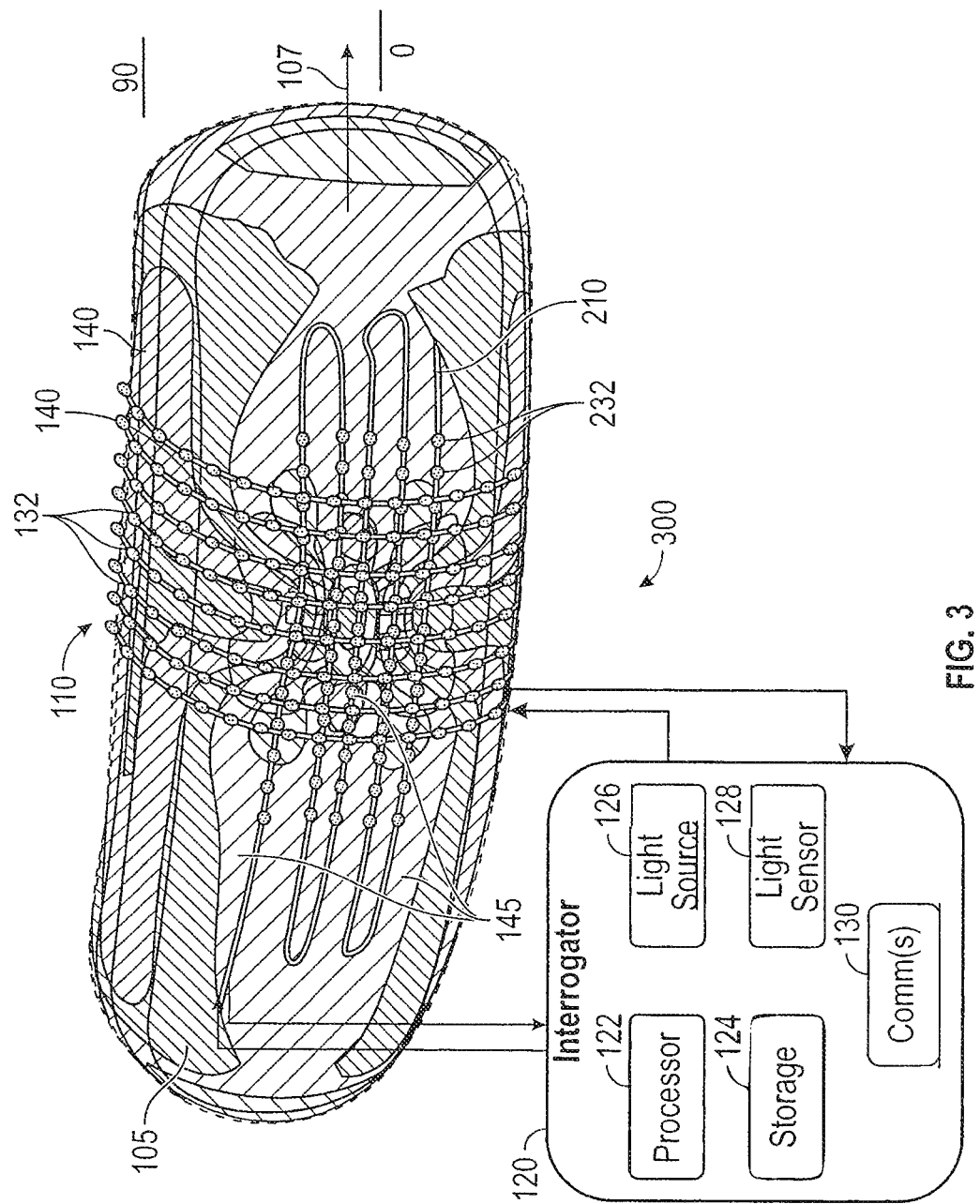
FIG. 3 illustrates two optical strain gauges attached to the exterior of a pipe in accordance with an example embodiment of the disclosure.

Referring now to FIG. 3, another optical strain gauge system 300 is illustrated. Optical strain gauge system 300 comprises an optical sensing interrogator 120 similar to that described previously in connection with FIG. 1. It can be assumed that the previous description of the components and operation of the optical sensing interrogator 120 provided in connection with FIG. 1 also applies to the interrogator 120 illustrated in FIG. 3. Optical strain gauge system 300 is attached to pipe section 105 for measuring both hoop strain and axial strain on the exterior surface of the pipe. As explained in connection with FIG. 1, the pipe section 105 is a model of a pipe section created using finite element analysis software. The pipe section 105 transports fluids in the direction of the longitudinal axis 107 of the pipe section 105 and the pipe section 105 may be part of a larger piping system.

It can be assumed that the model shown in FIG. 3 has the same properties and is subject to the same load as described above for FIG. 1. The model includes an area of wear located at a height of the pipe section aligned with the 0 degree position and at approximately the midpoint from the left end and the right end of the pipe 105. As a result of the pressure and the area of wear, uneven hoop strains and axial strains are present on the exterior surface of the pipe 105. The varying shading illustrated on the exterior of the pipe 105 indicates different magnitudes of hoop strain and axial strain. The hoop and axial strains illustrated in FIG. 3 are a combination of the hoop strains illustrated in FIG. 1 and the axial strains illustrated in FIG. 2. The strains include areas of relatively large hoop and axial strain 140 as well as areas of relatively small hoop and axial strain 145.

The optical strain gauge system 300 is a combination of the optical strain gauge systems 100 and 200 of FIGS. 1 and 2. Optical strain gauge system 300 comprises an optical strain gauge 110 with at least one optical fiber for measuring hoop stress, as described in connection with FIG. 1, and an optical strain gauge 210 with at least one optical fiber for measuring axial stress, as described in connection with FIG. 2. Optical fibers 110 and 210 comprise FBGs 132 and 232, respectively, along the lengths of the fibers. Overlaying the optical fibers of optical strain gauge 110 and optical strain gauge 210 provides a greater density of FBGs and thus a greater density of strain measurements. The greater density of strain measurements provides a more detailed assessment of weaknesses or wear areas on the interior surface of the pipe 105 without accessing the interior of the pipe 105.

Figure 4:
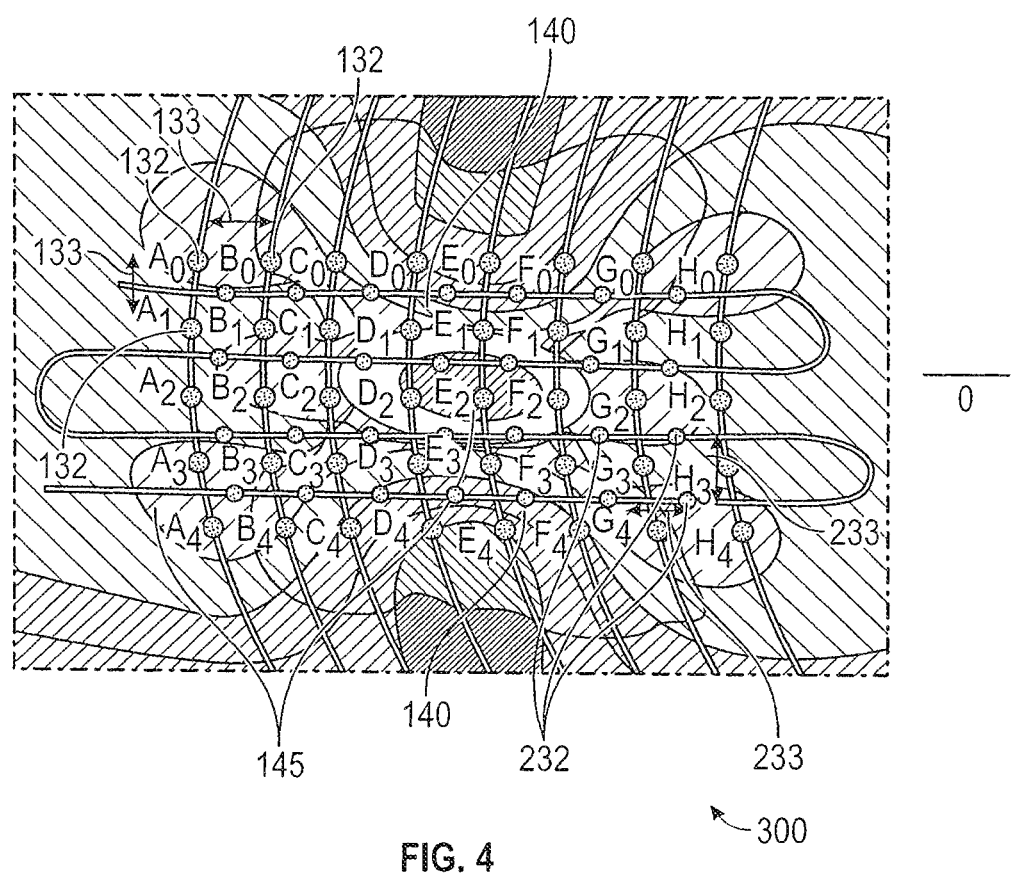
FIG. 4 is an enlarged view of the two optical strain gauges of FIG. 3 in accordance with an example embodiment of the disclosure.

FIG. 4 provides an enlarged view of the overlapping optical strain gauge systems 100 and 200 further illustrating the two-dimensional arrays of FBGs. As can be seen in FIG. 4, the FBGs 132 of optical strain gauge system 100 form a two-dimensional array of strain measurement points. Each FBG 132 is separated horizontally and vertically from an adjacent FBG 132 of the optical strain gauge system 100 by a first distance 133. Similarly, the FBGs 232 of the optical strain gauge system 200 form a two-dimensional array of strain measurement points. Each FBG 232 is separated horizontally and vertically from an adjacent FBG 232 of the optical strain gauge system 200 by a second distance 233. The first distance and the second distance fall within a range that is not greater than 4 cm and not less than 4 mm. The first distance and the second distance also can depend on the size of the pipe. As one example, for a typical pipe used in the transport of oil and gas with an outer diameter of 164.25 mm (6 inches) to 219 mm (8 inches), a preferred first distance and second distance is 1 cm. As another example, for a smaller pipe having an outer diameter of 54.75 mm (2 inches), a preferred first distance and second distance is 6 mm. The first distance and the second distance are chosen to be sufficiently small to provide a density of strain measurements that provide an accurate assessment of the strains present on the exterior surface of the pipe 105. A sufficient density of strain measurements is necessary to detect wear areas that are shaped as a narrow channel or a hemispherical cavity on the interior surface of the pipe. Accurate detection of wear areas within the pipe is necessary to avoid pipe failures and to determine optimal times when pipe sections should be replaced.

Figure 5:
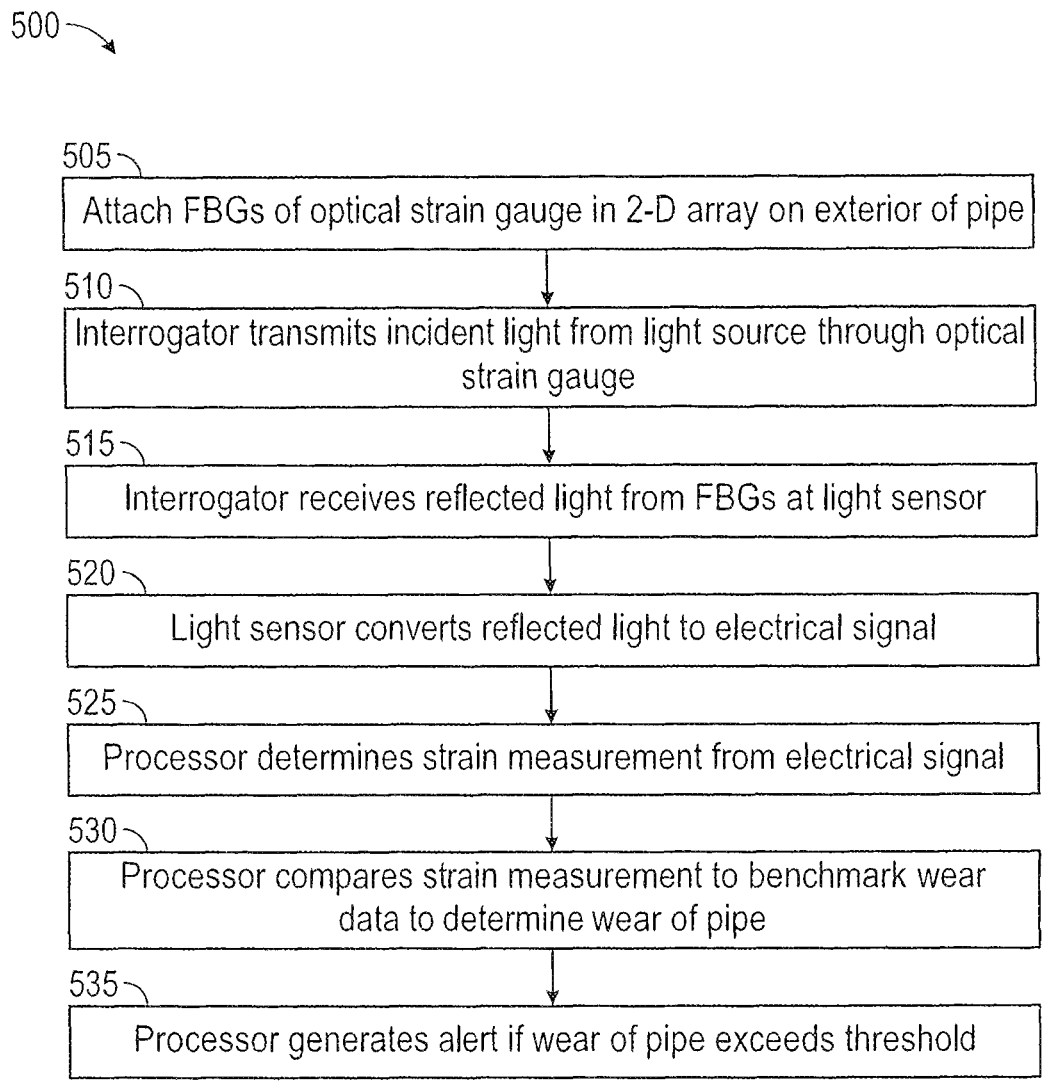
FIG. 5 is a flowchart illustrating a method of using an optical strain gauge in accordance with an example embodiment of the disclosure.

Referring now to FIG. 5, an example method 500 for measuring strain on an exterior surface of a pipe is illustrated. It should be understood that method 500 is a non-limiting example and in alternate embodiments certain steps of method 500 may be modified, combined, performed in parallel, or omitted.

Beginning with operation 505, an optical strain gauge is attached to the exterior surface of a section of pipe. The optical strain gauge is attached so that the FBGs are arranged in a two-dimensional array on the exterior surface of the pipe. The FBGs are arranged so that the spacing between FBGs is not greater than 4 cm and not less than 4 mm in order to provide a sufficient density of strain measurements. It should also be understood that multiple optical strain gauges can be attached to the pipe. The multiple optical strain gauges can be separate from each other or can overlap.

In operation 510, a light source of an optical sensing interrogator transmits incident light through the optical fiber of the optical strain gauge. The incident light encounters the FBGs that reflect portions of the incident light returning reflected light to a light sensor of the optical sensing interrogator in operation 515. In operation 520, the light sensor converts the reflected light into electrical signals that are processed, in operation 525, by a processor. It should be understood that the processing of the electrical signals from the light sensor can be performed at an interrogator local to the pipe or the electrical signals can be transmitted to a remote device for processing.

In operation 530, the processor can compare the strain measurements calculated from the reflected light to benchmark data associated with areas of wear for a comparable pipe. For example, benchmark data can be gathered from historical data correlating strain on the exterior surface of a pipe to areas of wear on the interior surface of the pipe. As another example, in addition to or as an alternative to comparing the strain measurements to benchmark data, the processor can compare the strain measurements to prior strain measurements collected for the section of pipe to which the optical strain gauge is attached. In other words, strain measurement data can be collected for a section of pipe over a period of time, such as several months or years, and the strain measurement data can be analyzed for changes over time indicating increasing wear. In some example embodiments, the processor can use predictive analytics, such as machine learning resources, to analyze strain measurement data and predict when a section of pipe may need to be replaced due to areas of wear.

Lastly, in operation 535, the processor can generate an alert if it determines that that the estimated wear on the interior surface of the pipe section exceeds a threshold. The alert can be generated based on a comparison of the strain measurements against benchmark data for comparable pipe. Alternatively, the alert can be generated based on an analysis of historical strain measurements collected from the particular section of pipe being analyzed. As a non-limiting example, the threshold can be set based on the depth of the wear exceeding a percentage of the nominal thickness of the pipe. The threshold can also be set based on a determination that the area of the wear exceeds a predetermined area on the interior surface of the pipe.

It should be understood that once the optical strain gauge is attached to the pipe as described in operation 505, operations 510 through 535 can be repeated at an interval appropriate for monitoring the pipe. For example, operations 510 through 535 can be repeated weekly, monthly, or annually as needed to monitor the integrity of the pipe.

Referring now to FIGS. 6 through 12B, example feasibility testing performed on a pipe will be described. The feasibility testing involves determining whether an area of wear on an interior surface of the pipe causes a measurable change in strain on the exterior surface of the pipe when the pipe is pressurized. The feasibility testing was performed on a sample of pipe using optical strain gauges. Additional testing was performed on the sample of pipe using resistive foil strain gauges. Lastly, the sample of pipe was modeled and analyzed using finite element software. As will be described further below, the results of the three testing methods confirmed the detectability of changes in surface strain correlating to areas of wear on the interior surface of the pipe.

Figure 6:
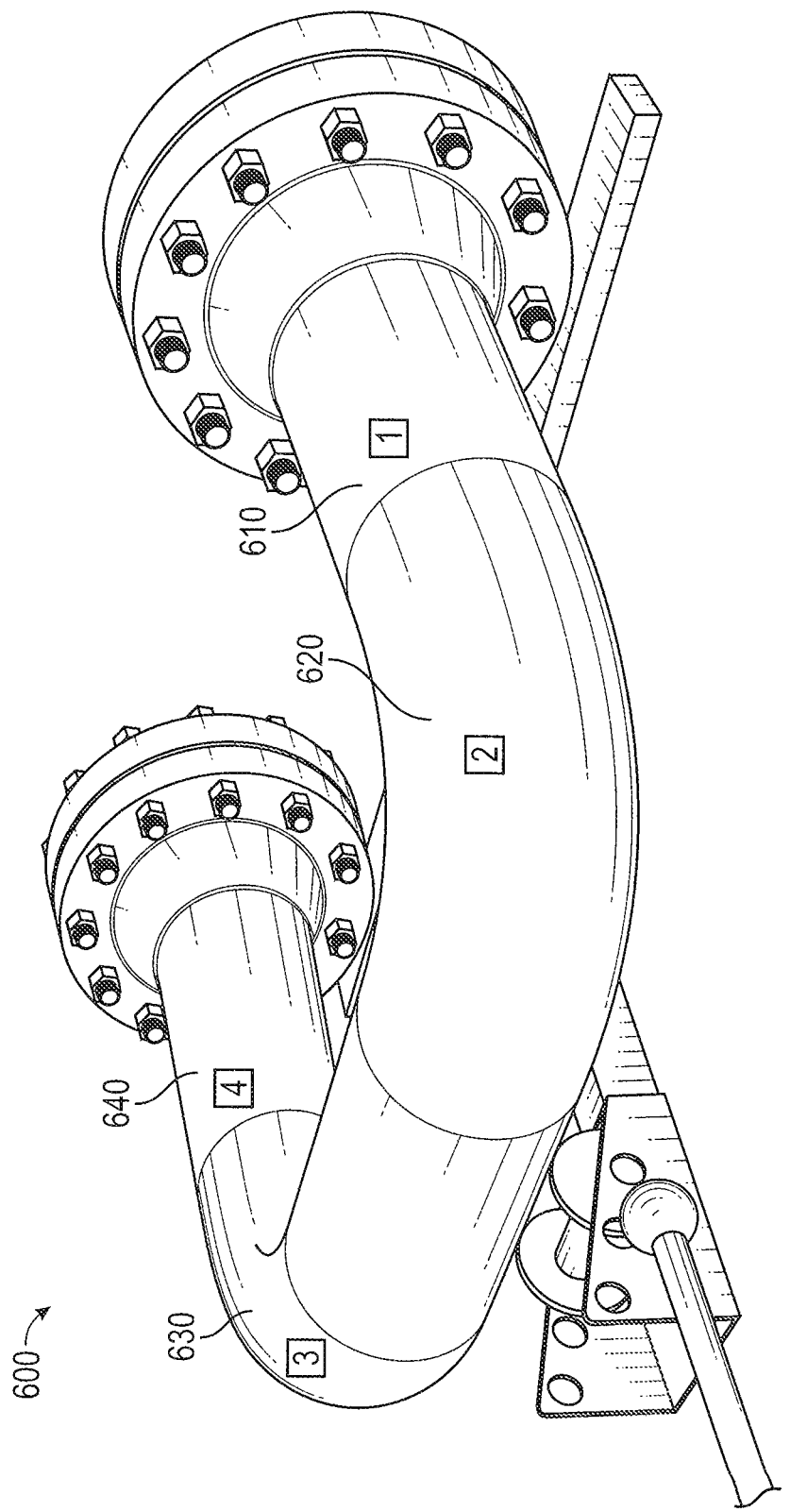
FIG. 6 illustrates a pipe used for testing optical strain gauges in accordance with an example embodiment of the disclosure.
Figure 7:
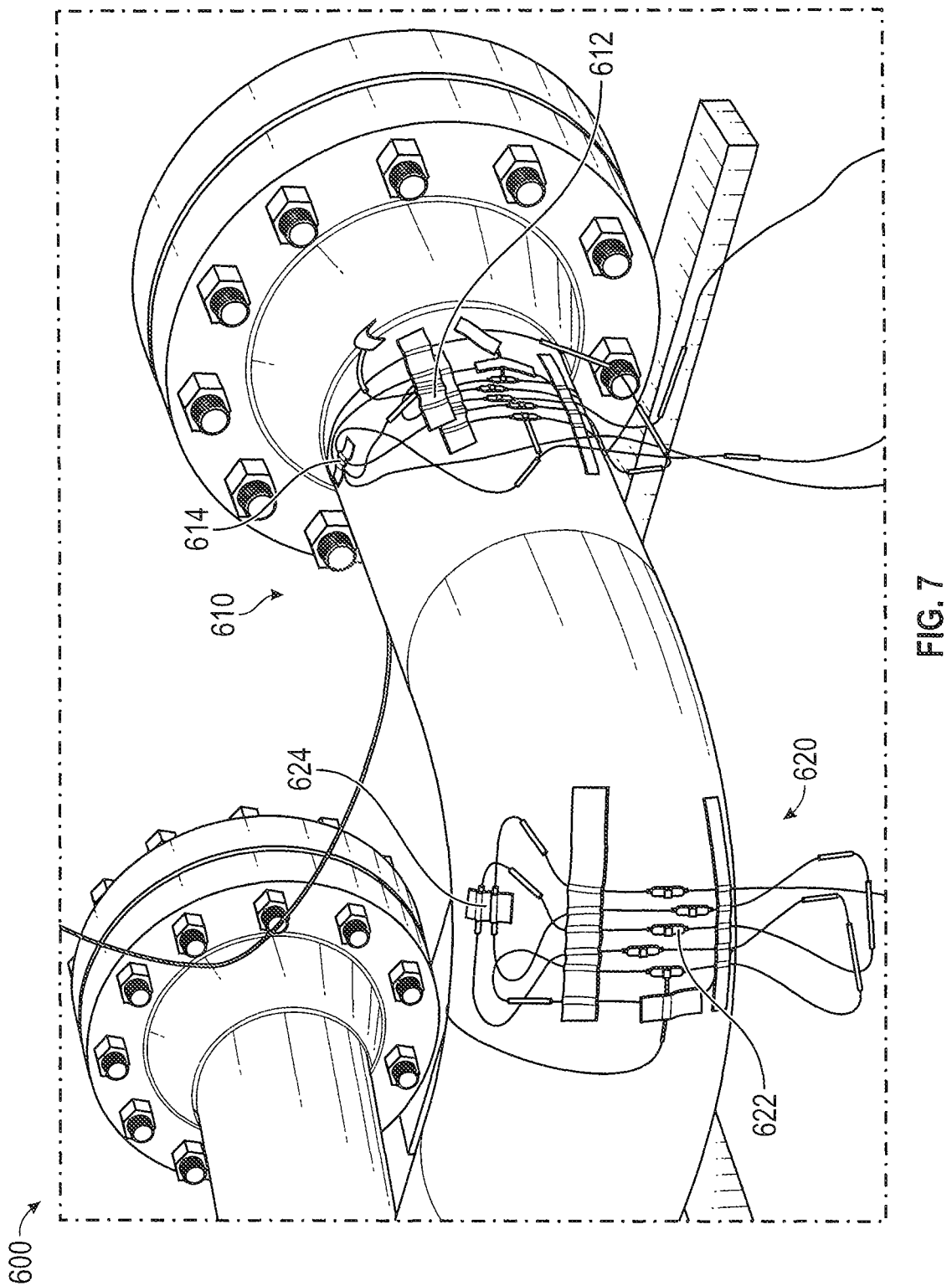
FIG. 7 is an enlarged view of a first side of the pipe of FIG. 6 in accordance with an example embodiment of the disclosure.
Figure 8:
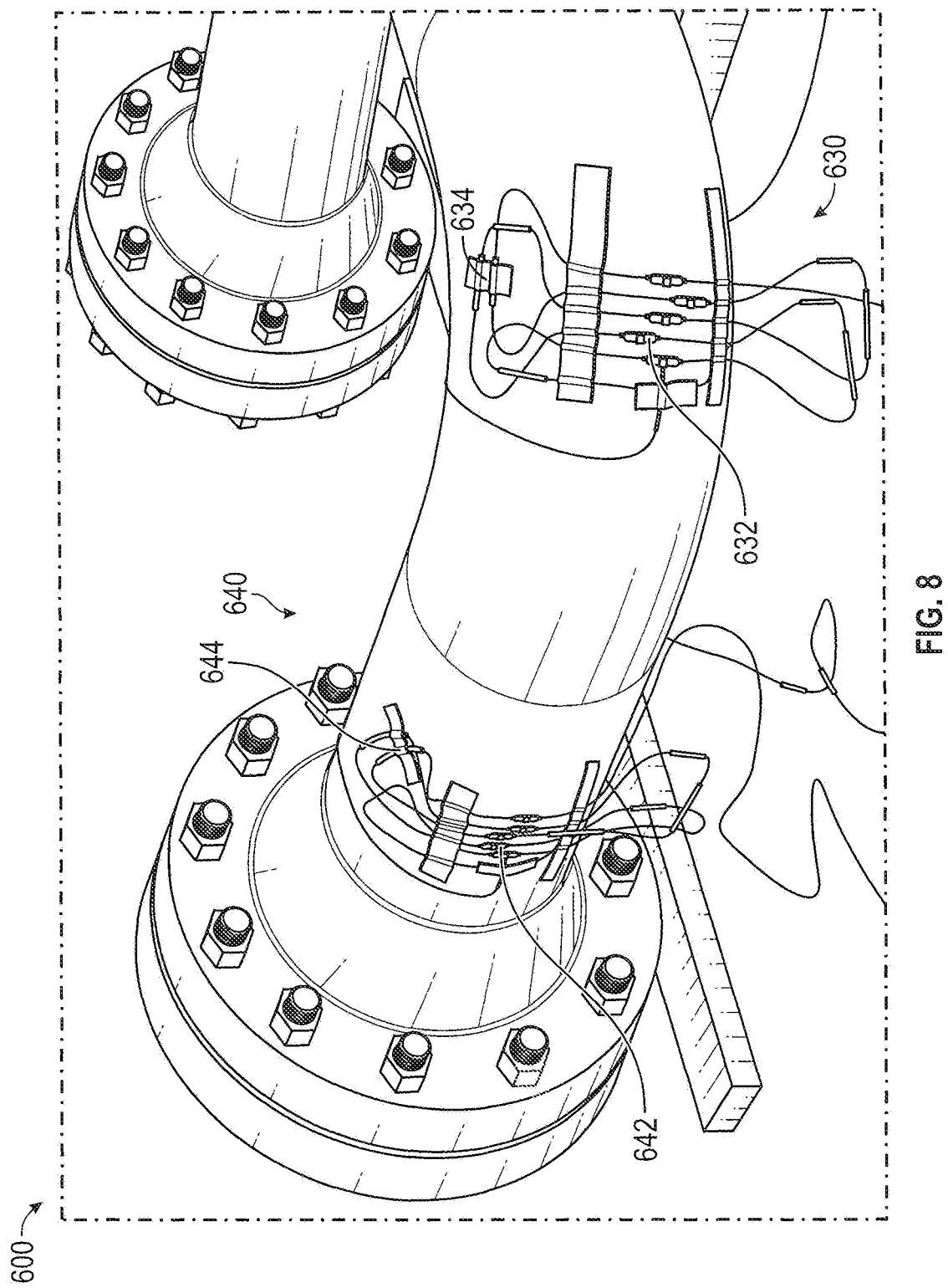
FIG. 8 is an enlarged view of a second side of the pipe of FIG. 6 in accordance with an example embodiment of the disclosure.

FIGS. 6-8 are photos of the pipe used for the feasibility testing. FIG. 6 shows the pipe 600, which comprises welded 219 mm (8-inch) A106 pipe, elbows, and A105N flanges. In order simulate the wear that may develop within a pipe, areas of wear having a depth of 3.05 mm (0.12 inches) were machined into the interior surfaces of the pipe at eroded straight pipe section 610 and at eroded elbow pipe section 620. The areas of wear were machined into the interior surface of the pipe at a height on the pipe wall that is aligned with the 0 degree position for consistency with model described previously in connection with FIGS. 1-4. Uneroded elbow pipe section 630 and uneroded straight pipe section 640 serve as controls for comparison to the eroded sections.

FIG. 7 provides an enlarged view of the portion of the pipe 600 with the eroded straight pipe section 610 and the eroded elbow pipe section 620. FIG. 7 shows an optical strain gauge 612 attached to the exterior of the pipe over an area that is directly outboard (i.e., at the same 0 degree position) of the area of wear on the interior surface of the eroded straight pipe section 610. At the 90 degree position (i.e., at the top of the eroded straight section 610), a temperature gauge 614 is attached to the pipe. Similarly, an optical strain gauge 622 is attached to the exterior of the pipe over an area that is directly outboard (i.e. at the same 0 degree position) of the area of wear on the interior surface of the eroded elbow pipe section 620. At the 90 degree position (i.e., at the top of the eroded elbow pipe section 620), a temperature gauge 624 is attached to the pipe.

FIG. 8 provides an enlarged view of the portion of the pipe 600 without the machined areas of wear, which include the uneroded straight pipe section 640 and the eroded elbow pipe section 630. FIG. 8 shows an optical strain gauge 642 attached to the exterior of the pipe at the 0 degree position of the uneroded straight pipe section 640. At the 90 degree position (i.e., at the top of the uneroded straight section 640), a temperature gauge 644 is attached to the pipe. Similarly, an optical strain gauge 632 is attached to the exterior of the pipe at the 0 degree position of the uneroded elbow pipe section 630. At the 90 degree position (i.e., at the top of the uneroded elbow pipe section 630), a temperature gauge 624 is attached to the pipe. The temperature gauges were used to compensate for strain induced by changes in temperature of the pipe 600.

Each of the four optical strain gauges were attached to the pipe 600 using an adhesive and each optical strain gauge included an arrangement of 5 FBGs positioned in parallel to each other. Only 5 FBGs were used with each optical strain gauge to simplify the feasibility test, but, consistent with the examples described in connection with FIGS. 1-5, in preferred embodiments FBGs would be arranged in a two-dimensional array on the exterior surface of the pipe in order to obtain an accurate assessment of strain over the surface of interest. During the testing, the pipe 600 was pressurized and an optical sensing interrogator acquired and logged optical strain data. A processor converted the optical data into strain measurements for each point where an FBG was located.

Figure 10A:
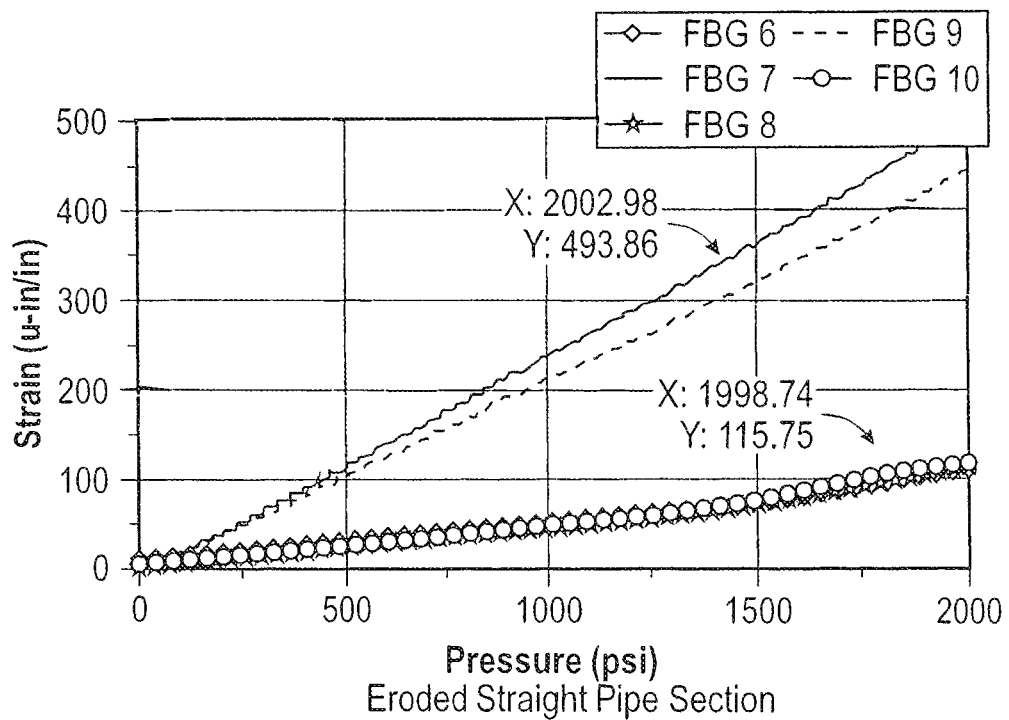
FIGS. 10A and 10B show plots of data collected from optical strain gauges in accordance with an example embodiment of the disclosure.
Figure 10B:
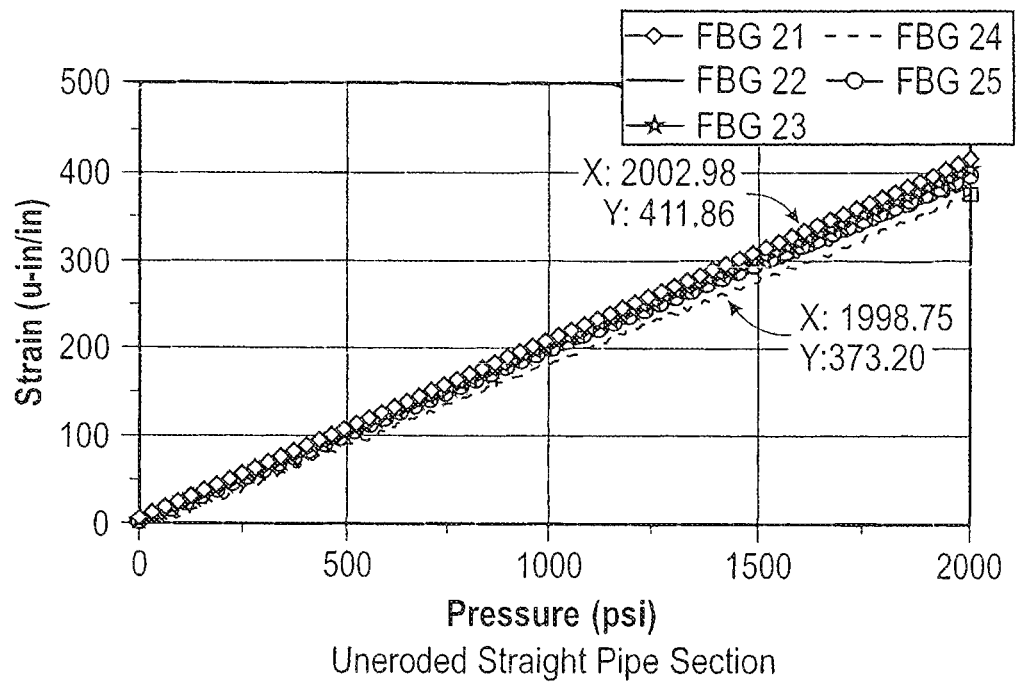

FIGS. 10A and 10B provide plots of hoop strain and pressure data for data collected from the optical strain gauges positioned at the eroded straight pipe section 610 (FIG. 10A) and the uneroded straight pipe section 640 (FIG. 10B). As the plot in FIG. 10B illustrates, there was little variance in the hoop strain at the uneroded straight pipe section 640. However, the eroded straight pipe section 610 demonstrated a variation in measured hoop strain at the locations of the FBGs of approximately 300 microstrains at 2000 psi. Specifically, the FBGs located directly outboard of the wear area measured a drop in strain due to the pipe deforming inward in this area.

Figure 11A:
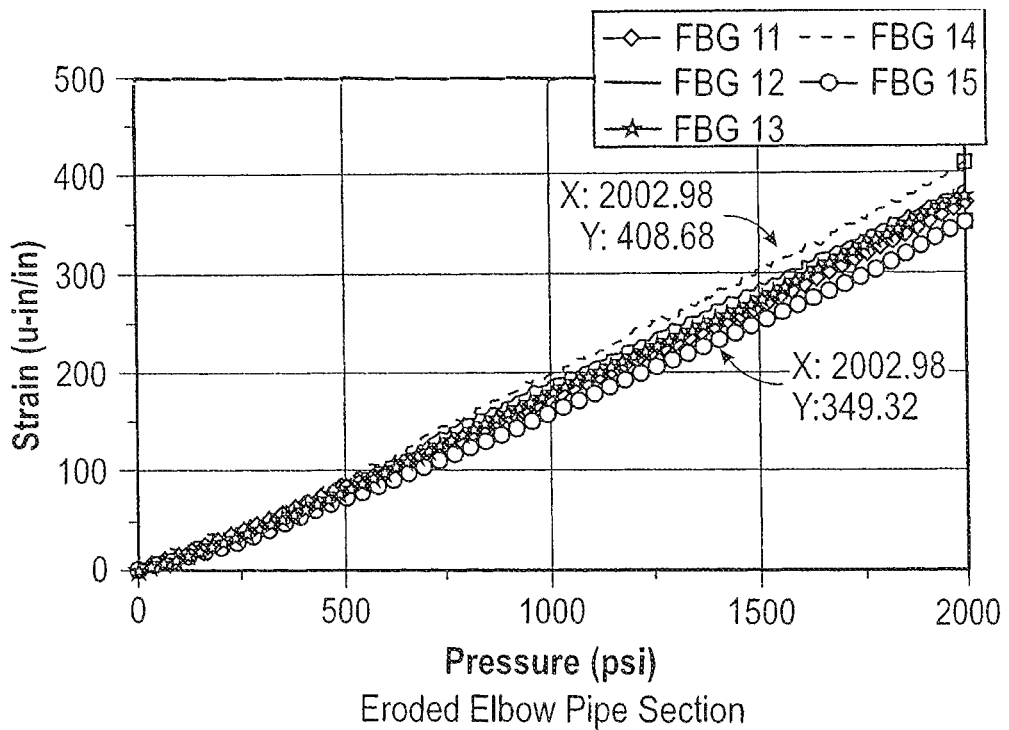
FIGS. 11A and 11B show plots of data collected from optical strain gauges in accordance with an example embodiment of the disclosure.
Figure 11B:
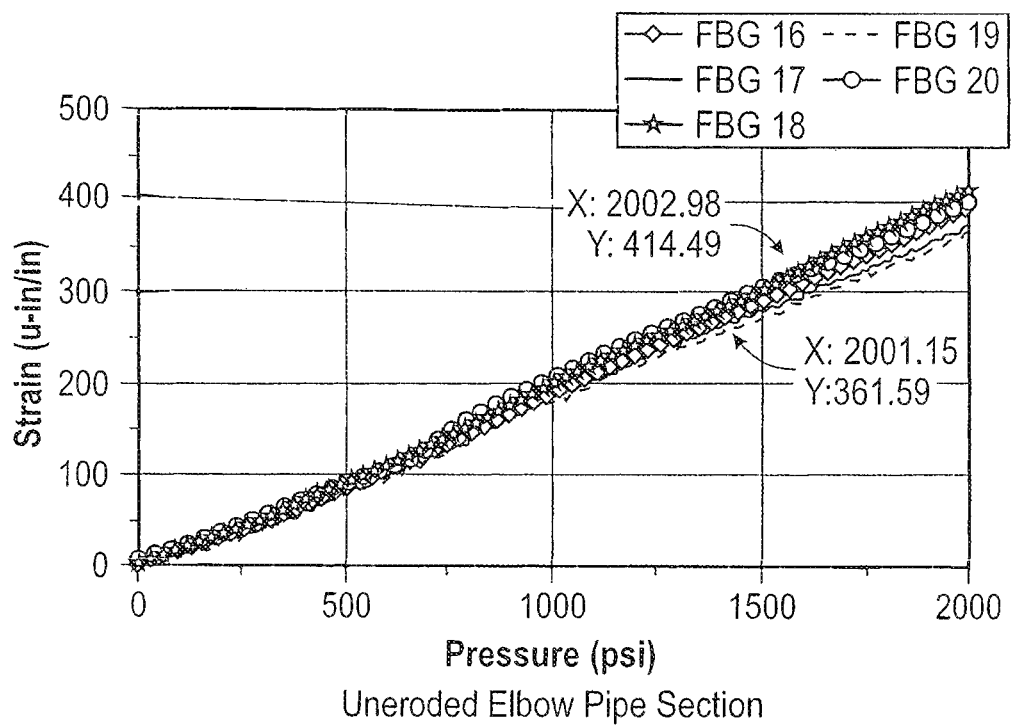

FIGS. 11A and 11B provide plots of strain and pressure data for data collected from the optical strain gauges positioned at the eroded elbow pipe section 620 (FIG. 11A) and the uneroded elbow pipe section 630 (FIG. 11B). As the plot in FIG. 11B illustrates, there was little variance in the strain at the uneroded elbow pipe section 630. However, the eroded elbow pipe section 620 demonstrated a variation in measured strain of approximately 65 microstrains at 2000 psi. Specifically, the FBGs located directly outboard of the wear area measured a drop in strain due to the pipe deforming inward in this area.

Figure 12A:
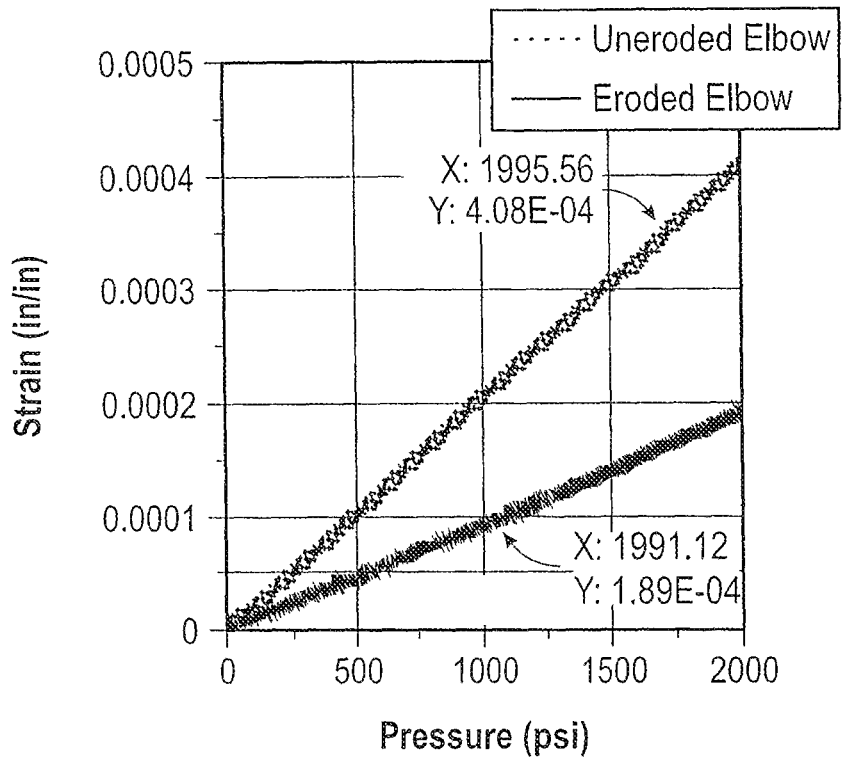
FIGS. 12A and 12B show plots of data collected from resistive foil strain gauges in accordance with an example embodiment of the disclosure.
Figure 12B:
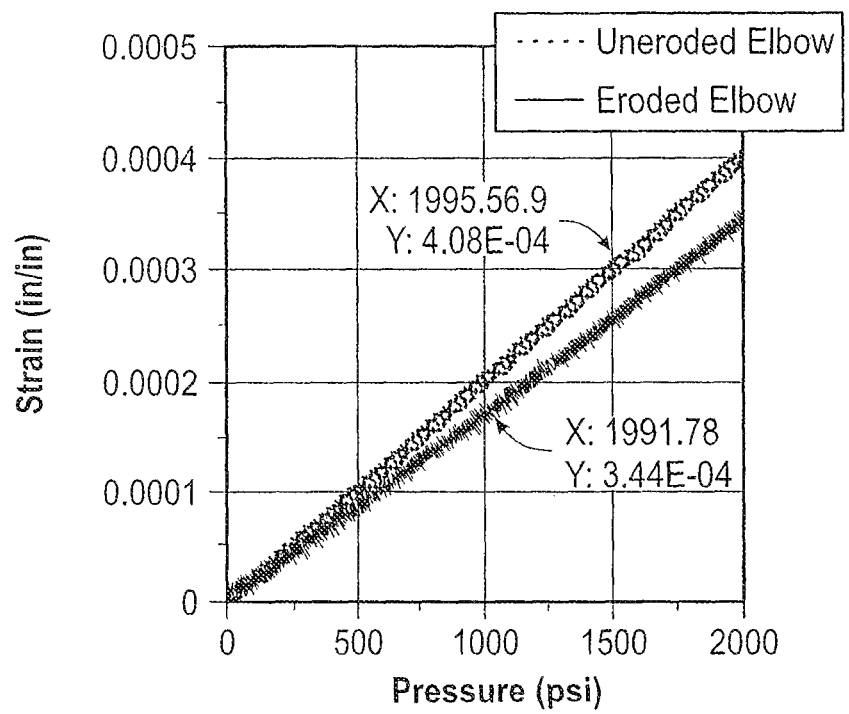

Additional feasibility testing was performed using resistive foil strain gauges substituted in the positions of the optical strain gauges on the pipe 600. The resistive foil strain gauges produced similar results as illustrated by the plots in FIGS. 12A and 12B. FIG. 12A illustrates plots of strain and pressure data for the eroded straight pipe section 610 and the uneroded straight pipe section 640. Similar to the optical strain gauges, the resistive foil strain gauges detected a drop in strain of approximately 219 microstrains at the points directly outboard of the wear area. FIG. 12B illustrates plots of strain and pressure data for the eroded elbow pipe section 620 and the uneroded elbow pipe section 630. Again, similar to the optical strain gauges, the resistive foil strain gauges detected a drop in strain of approximately 56 microstrains at the points directly outboard of the wear area.

Lastly, the feasibility testing was also validated using finite element software to create a model to simulate the pipe 600 with areas of wear on the interior surface of the pipe at 610 and 620. The simulation indicated drops in strain at sections 610 and 620 that were similar to those measured using the optical strain gauges and the resistive foil strain gauges. The table provided in FIG. 9 summarizes the data gathered for the three types of feasibility testing and shows a consistent drop in strain measured for the eroded sections of the pipe.

The feasibility testing confirmed that using optical strain gauges with arrays of FBGs can provide useful strain measurements over an exterior area of a pipe. Furthermore, the feasibility testing confirmed that a drop in measurements of strain on the exterior surface of the pipe can be correlated to an area of wear on the interior surface of the pipe. By attaching the FBGs in a two-dimensional array over an area of the pipe, a more accurate picture of the variation in surface strain over the area can be assembled. The more accurate picture of surface strain variation can then be correlated to the shape of an area of wear on the interior surface of the pipe. The two-dimensional array of collected strain data is more useful in detecting narrow channels and hemispherical areas of wear on the interior surface of the pipe.

For any figure shown and described herein, one or more of the components may be omitted, added, repeated, and/or substituted. Additionally, it should be understood that in certain cases components of the example systems can be combined or can be separated into subcomponents. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An optical strain gauge system for a piping system, the optical strain gauge system comprising:
   a first optical strain gauge comprising a first plurality of fiber Bragg gratings, wherein the first optical strain gauge is configured to wrap around a circumference of an exterior surface of the piping system forming multiple loops of the first optical strain gauge;
   a second optical strain gauge overlapping the multiple loops of the first optical strain gauge and comprising a second plurality of fiber Bragg gratings, wherein the second optical strain gauge is configured to attach to the exterior surface of the piping system in an S pattern with major lengths of the S pattern parallel to a longitudinal axis of the piping system; and
   an optical sensing interrogator, the optical sensing interrogator comprising a light source, a light sensor, and a signal processor,
   wherein the light sensor is configured to convert reflected light from the plurality of fiber Bragg gratings into a plurality of electrical signals,
   wherein the signal processor is configured to convert the plurality of electrical signals into a plurality of strain measurements, and
   wherein the strain measurements provide an indication of wear on an interior surface of the piping system along both an interior circumference and an interior length of the piping system.

2. The optical strain gauge system of claim 1, wherein the plurality of strain measurements is compared to prior strain measurements for the piping system.

3. The optical strain gauge system of claim 1, wherein the plurality of strain measurements is compared to prior strain measurements collected from other piping systems.

4. The optical strain gauge system of claim 1, wherein the first optical strain gauge measures hoop strain and the second optical strain gauge measures axial strain.

5. The optical strain gauge system of claim 1, wherein each loop of the multiple loops of the first optical strain gauge forms a circular plane that is substantially perpendicular to the longitudinal axis of the piping system.

6. A method for using an optical strain gauge system with a piping system, the method comprising:
   attaching a first plurality of fiber Bragg gratings of a first optical strain gauge around an exterior surface of the piping system, the first optical strain gauge forming multiple loops around a circumference of the piping system;
   attaching a second plurality of fiber Bragg gratings of a second optical strain gauge to the exterior surface of the piping system in an S pattern with major lengths of the S pattern parallel to a longitudinal axis of the piping system and overlapping the multiple loops of the first optical strain gauge;

transmitting an incident light from a light source through the first optical strain gauge and the second optical strain gauge;

receiving, at a light sensor, a reflected light from the first plurality of fiber Bragg gratings and the second plurality of fiber Bragg gratings;

converting, by the light sensor, the reflected light into a plurality of electrical signals; and determining, by a signal processor, a plurality of strain measurements from the plurality of electrical signals, wherein the plurality of strain measurements provide an indication of wear on an interior surface of the piping system along both an interior circumference and an interior length of the piping system.

7. The method of claim 6, further comprising comparing the plurality of strain measurements to prior strain measurements for the piping system.

8. The method of claim 6, further comprising comparing the plurality of strain measurements to prior strain measurements collected from other piping systems.

9. The method of claim 6, wherein the first optical strain gauge measures hoop strain and the second optical strain gauge measures axial strain.

10. The method of claim 6, wherein each loop of the multiple loops of the first optical strain gauge forms a circular plane that is substantially perpendicular to the longitudinal axis of the piping system.

11. An optical strain gauge system for a piping system, the optical strain gauge system comprising:

an optical strain gauge comprising a plurality of fiber Bragg gratings, wherein the optical strain gauge is configured to attach to an exterior surface of the piping system in an S pattern forming a two-dimensional array of the plurality of fiber Bragg gratings on the exterior surface of the piping system; and an optical sensing interrogator, the optical sensing interrogator comprising a light source, a light sensor, and a signal processor, wherein the light sensor is configured to convert reflected light from the plurality of fiber Bragg gratings into a plurality of electrical signals, wherein the signal processor is configured to convert the plurality of electrical signals into a plurality of strain measurements, and wherein the strain measurements provide an indication of wear on an interior surface of the piping system along both an interior circumference and an interior length of the piping system.

12. The optical strain gauge system of claim 11, wherein the plurality of strain measurements is compared to prior strain measurements for the piping system.

13. The optical strain gauge system of claim 11, wherein the plurality of strain measurements is compared to prior strain measurements collected from other piping systems.

* * * * *